United States Patent [19]

Taguchi

[11] Patent Number: 6,081,817
[45] Date of Patent: *Jun. 27, 2000

[54] DOCUMENT EDIT SYSTEM WHICH CONCURRENTLY DISPLAYS AND EDITS DOCUMENTS AT THE PAGE UNIT LEVEL

[75] Inventor: Yasuo Taguchi, Kanagawa, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/615,083

[22] Filed: Mar. 14, 1996

[30] Foreign Application Priority Data

Apr. 20, 1995 [JP] Japan .................................. 7-117738

[51] Int. Cl.[7] .................................................. G06F 17/21
[52] U.S. Cl. ............................................................ 707/526
[58] Field of Search .................................... 395/788, 776, 395/761; 707/526, 514, 500, 530

[56] References Cited

U.S. PATENT DOCUMENTS

| | | | |
|---|---|---|---|
| 5,060,135 | 10/1991 | Levine et al. | 395/351 |
| 5,101,345 | 3/1992 | MacPhail | 395/601 |
| 5,132,900 | 7/1992 | Gilchrist et al. | 395/609 |
| 5,179,718 | 1/1993 | MacPhail | 395/603 |
| 5,204,812 | 4/1993 | Kasiraj et al. | 395/609 |
| 5,233,687 | 8/1993 | Henderson, Jr. et al. | 395/346 |
| 5,339,390 | 8/1994 | Robertson et al. | 395/342 |
| 5,463,725 | 10/1995 | Henckel et al. | 395/650 |
| 5,504,850 | 4/1996 | Aoyama | 395/326 |
| 5,621,874 | 4/1997 | Lucas et al. | 395/761 |
| 5,732,403 | 3/1998 | Nakamura | 707/514 |

FOREIGN PATENT DOCUMENTS 6-1486  1/1994  Japan .

OTHER PUBLICATIONS

Tonomura et al., "Content Oriented Visual Interface Using Video Icons for Visual Database Systems", 1989 IEEE Workshop on Visual Languages, pp. 68–73, Oct. 1989.

*Primary Examiner*—Joseph H. Feild
*Attorney, Agent, or Firm*—Finnegan, Henderson, Farabow, Garrett & Dunner, L.L.P.

[57] ABSTRACT

A document edit system that performs page unit editing. The pages of a selected document are displayed in a stacked reduced offset overlapped position and are available for immediate editing independent of the page unit's location within the document stack. Display control data and actual data are stored for each page in internal memory and are changed in response to an edit command. Edit commands include page move and page copy within a single document, or from one document to another, and for creating a new document. The page move command may also be used to discard any selected page in the displayed document.

9 Claims, 10 Drawing Sheets

DOCUMENT EDIT SYSTEM WHICH CONCURRENTLY DISPLAYS AND EDITS DOCUMENTS AT THE PAGE UNIT LEVEL

FIELD OF THE INVENTION

This invention relates to a document edit system which edits a document consisting of a plurality of pages in page units and more particularly to a document edit system which performs edit processing such as a page move, copy, and discard by simple data processing.

BACKGROUND OF THE INVENTION

Hitherto, in the document processing field, various devices and improvements have been proposed for enabling a document image made up of electronic data to be handled like a document printed on paper.

As one of them, a document display system for displaying a document consisting of a plurality of pages on a display screen with the pages bundled is proposed in Japanese Patent Publication No. Hei. 6-1486.

The document display system is provided with a first storage for storing document image data and a second storage for storing information such as the names, attributes, etc., of the document image data. In document display processing, the document display system displays each document page on the screen in schematic form with symbols based on the information stored in the second storage for enabling the operator to perform edits for each page.

In the document display system, if the document displayed on the screen is edited for each page, the document on the screen display is edited, but the actual data (document image data) stored in the first storage is not edited. Therefore, the document image can be handled on the screen display like a document printed on paper, but edit processing is not performed for the actual data.

On the other hand, document edit systems such as word-processors and DTP systems enable edit processing such as moving, copying, etc., in page units, but do not display document pages in offset overlapped relation for displaying the document thickness on the display screen, and do not enable the document image to be handled on the screen display like a document printed on paper.

Thus, in conventional document processing, although documents can be handled on the screen display like those printed on paper, edit processing cannot be applied to actual data.

Therefore, edit processing for handling documents on a screen display like those printed on paper has not yet been devised; electronic data documents cannot be handled as paper documents at present.

OBJECTS SUMMARY OF THE INVENTION

It is therefore a first object of the invention to provide a electronic document edit system which edits a multi-page document like a printed paper document.

It is a second object of the invention to provide an electronic document edit system which performs a page move process for moving a page within a multi-page document in a manner similar to processing of a printed paper document.

It is a third object of the invention to provide an electronic document edit system which performs a page move process for moving a page to a different multi-page document in a manner similar to processing of a printed paper document.

It is a fourth object of the invention to provide an electronic edit system which performs a page move process for creating a new multi-page document in a manner similar to processing of a printed paper document.

It is a fifth object of the invention to provide an electronic document edit system which performs a page discard process for a multi-page document in a manner similar to processing of a printed paper document.

It is a sixth object of the invention to provide an electronic edit system which performs a page copy process for a multi-page document in a manner similar to processing of a printed paper document.

It is a seventh object of the invention to provide an electronic document edit system which performs a page copy process for copying a page of a multi-page document into a different multi-page document in a manner similar to processing of a printed paper document.

It is an eighth object of the invention to provide a an electronic document edit system which performs a page copy process for creating a new multi-page document in a manner similar to processing of a printed paper document.

According to an aspect of the invention, there is provided a document edit system for editing a document comprising input means for the user to enter edit commands, edit processing means for editing document data in page units based on the edit commands, an internal memory including read/write storage means for use as a work area of the dit processing means, an external memory including read/write storage means for storing document data, display processing means for composing page images relating to document data, and a display for displaying the page image composed by the display processing means.

The page unit edit system performs document editing on a page-by-page basis, wherein displayed pages correspond to the document's actual pages. Each document is displayed on the screen in a reduced format with each page of the document displayed in a reduced, offset, overlapped, frame position, giving the displayed document depth appearance. Additionally, each displayed page is representative of the size and orientation of its corresponding actual page. Also, the image of the document's displayed top page corresponds, in reduced form, to the page's document data. The user decides the top page and which and how many documents to display on the screen. Finally, folder, discard, and copy icons are located in a preset area on the screen.

Each displayed page unit has associated internal and external memory containing document data consisting of actual page data and display control data. The actual data, loaded into the internal memory from the external memory, is the page-by-page data contained in the document. The actual data for each page also contains page size data, page orientation data, etc. The display control data section, created and located in internal memory, contains information such as: "display position," indicating the coordinates of the upper left corner of the top page of the document on the display screen; "position difference," indicating the offset amount of the coordinates of the upper left corner of each page following the top page; "display page," indicating the top page of the document; and "total number of pages," indicating the number of pages contained in the document. The actual data and the display control data are manipulated in response to the various page unit level edit commands to reflect the new status of the affected documents. New document data is created whenever an edit command creates a new document.

The present invention utilizes two types of page level edit commands available to the user—the move command and the copy command. The move command allows the user to choose any displayed page and either move the page to another location within the document, to a different displayed document, to the discard icon, to the folder icon, or to an unassigned area on the display screen. The copy command allows the user to choose any displayed page and either copy the page into another location within the existing document, to a different displayed document, to the folder icon, or to an unassigned area of the display screen. An error message will result if the user attempts to copy a page into the discard icon. The moving or copying of any selected page to an unassigned screen display area or to the folder icon has the effect of creating a new document.

To perform edit processing, such as, for example, moving or copying a page, the user may operate a control device such as a mouse to specify the page to be moved or copied. Next, the user drags the page to either the position in which the page is to be inserted, to the document folder icon, to an unassigned area, or, in the case of move only, to the discard icon. In response to these operations, the internal memory relating to the display control data and the actual data is changed. Using the move or copy commands to create new documents has the additional effect of creating new document data.

In addition to selecting a page by operation of a mouse, another way a page may be selected is by using the keyboard cursor keys in conjunction with other predetermined keys. To discriminate the move and copy edit commands from each other, for example, the user may operate the mouse while holding down a predetermined key, such as a function key. Also, if present, the user may exercise the copy icon.

DETAILED DESCRIPTION OF THE PREFERRED EMBODIMENT

Referring now to the accompanying drawings, there is shown a preferred embodiment of the invention.

Figure 1:
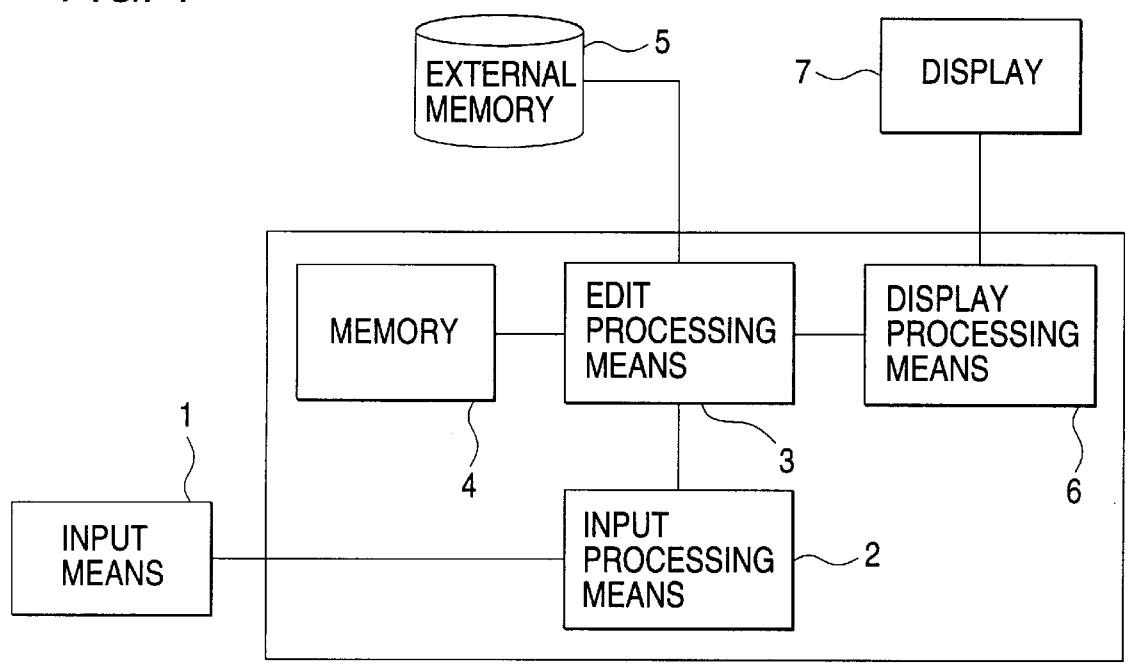
FIG. 1 is a block diagram showing the configuration of a document edit system according to one embodiment of the invention.

As shown in FIG. 1, a preferred embodiment of the inventive document edit system comprises input means 1 provided with a keyboard and a mouse for the user to enter edit commands, input processing means 2 for analyzing an input from the input means 1, edit processing means 3 for editing document data in page units based on the edit command, an internal memory 4 being made of read/write storage means such as a RAM for use as a work area of the edit processing means 3, an external memory 5 being a read/write store such as a hard disk drive for storing document data, display processing means 6 for composing document images in offset overlapped relation based on the document data, and a display 7 for displaying the document image composed by the display processing means 6 on a screen.

Figure 2:
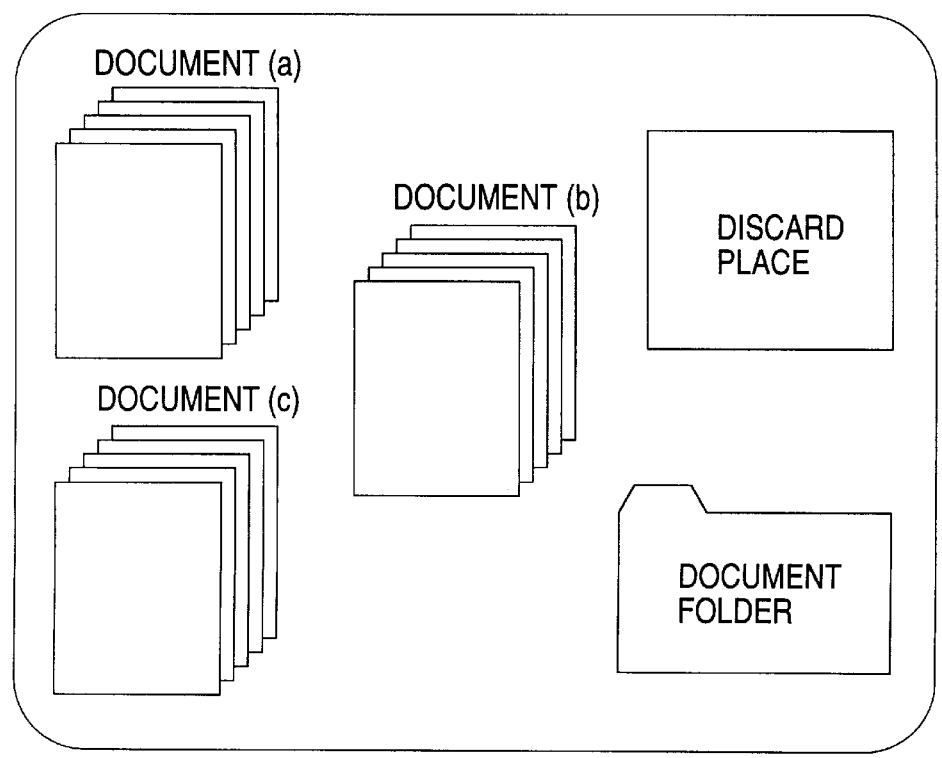
FIG. 2 is an illustration showing an example of a screen display generated by the system.

Icons of a discard place and a document folder are also displayed together with a plurality of documents (a), (b), and (c) on the screen of the display 7, for example, as shown in FIG. 2. The edit processing means 3 reads the data for each document stored in the internal memory 4 and the display processing means 6 composes the images of the documents (a), (b), and (c). The pages of each of the documents (a), (b), and (c) are displayed in offset overlapped relation. In the embodiment, outlines of portions of the later pages are displayed behind the top page to depict the actual size (page count) of each document consisting.

The icon of the discard place is displayed in a preset screen area managed by the edit processing means 3. When the mouse is operated on the discard icon, the edit processing means 3 discards (deletes) the specified document page, as described below.

The icon of the document folder is displayed in a preset screen area managed by the edit processing means 3. When mouse operation of the input means 1 is applied to the document folder area, the edit processing means 3 performs processing of storing the specified document page in the document folder, as described below.

Figure 3:
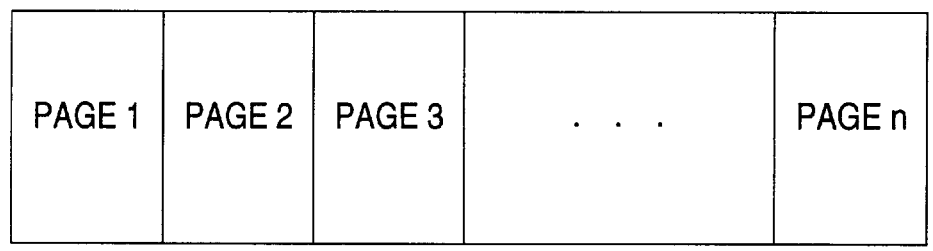
FIGS. 3(a) and 3(b) are conceptual drawings explaining document data structures.
Figure 3:
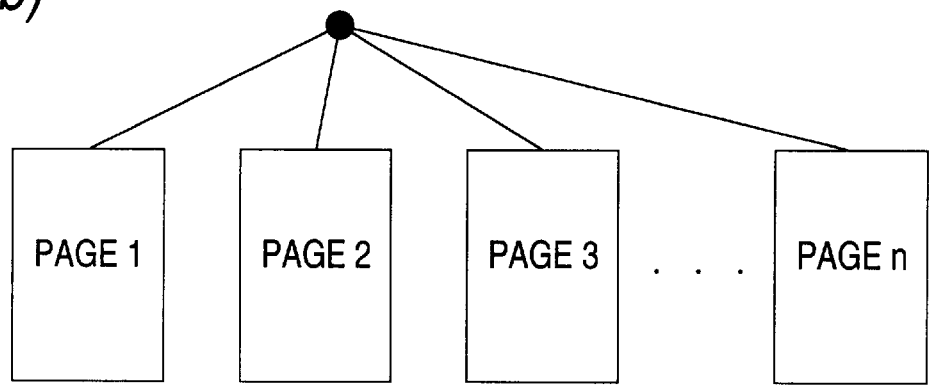

The data for each document is stored in the list format as shown in FIG. 3(a) or the tree structure format as shown in FIG. 3(b) in the internal memory 4 and the external memory 5 for each document. The document data has data for each page contained in the document and actual data for each page (document image data and size, orientation, etc.,) is related in page units.

Figure 4:
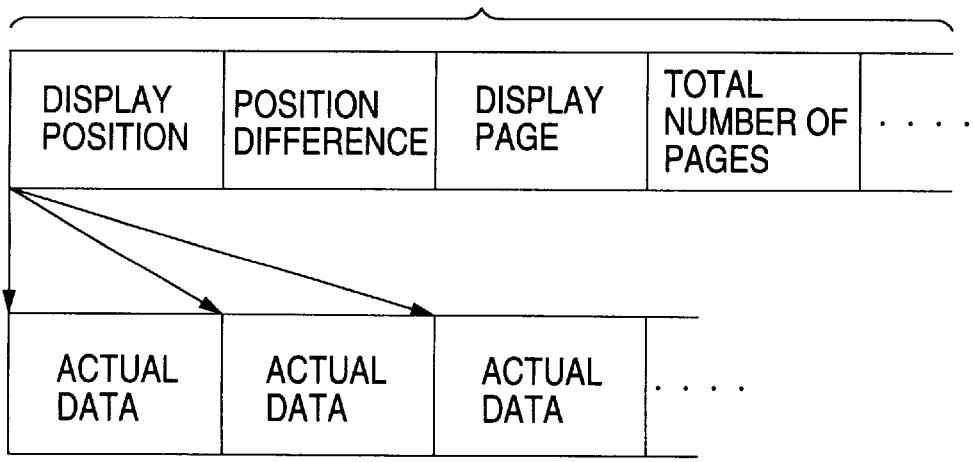
FIG. 4 is a schematic diagram explaining a document data structure example.

The data structure for each document will be discussed in more detail by taking the tree structure format as an example. As shown in FIG. 4, the data for each document consists of a display control data section and an actual data section and the actual data for each page is stored in the actual data section and related to the display control data section by a pointer, etc.

The display control data section contains information such as "display position" indicating the coordinates of the upper left corner of the top page in the document on the display screen, "position difference" indicating the offset amount of the coordinates of the upper left corner of each page following the top page, "display page" indicating which page in the document the top page is, and "total number of pages" indicating the number of pages contained in the document.

Therefore, the display processing means 6 displays the top page of each document at the screen position based on the "display position" and the following pages at screen positions offset from the top page in sequence based on the "position difference."

The edit processing means 3 executes document management functions to indicate where each page in the document is displayed on the screen based on the "display position" and "position difference," as to which page the current top page in the document is based on the "display page," and as to how many pages the document contains at this moment in time based on the "total number of pages." Further, the edit processing means 3 also manages the screen display area of each page based on the size, such as A4, and the orientation, such as portrait, of each page contained in the actual data together with the display position of each page.

The edit processing means 3 reads the document data from the external memory 5 into the internal memory 4 for executing data management functions as described above and executes processing routines such as revise, copy, deletion, etc., to the document data stored in the internal memory 4 based on edit commands entered through the input means 1 for executing edit processing functions as described below. Upon reception of a user command or completion of a predetermined process step or edit processing routine, the edit processing means 3 automatically writes back the document data resulting from the revision, etc., functions into the external memory 5 for reflecting the edit processing result in the document data stored in the external memory 5.

Edit processing in page units by the document edit system of the embodiment will be outlined with reference to FIGS. 5–9.

Figure 5:
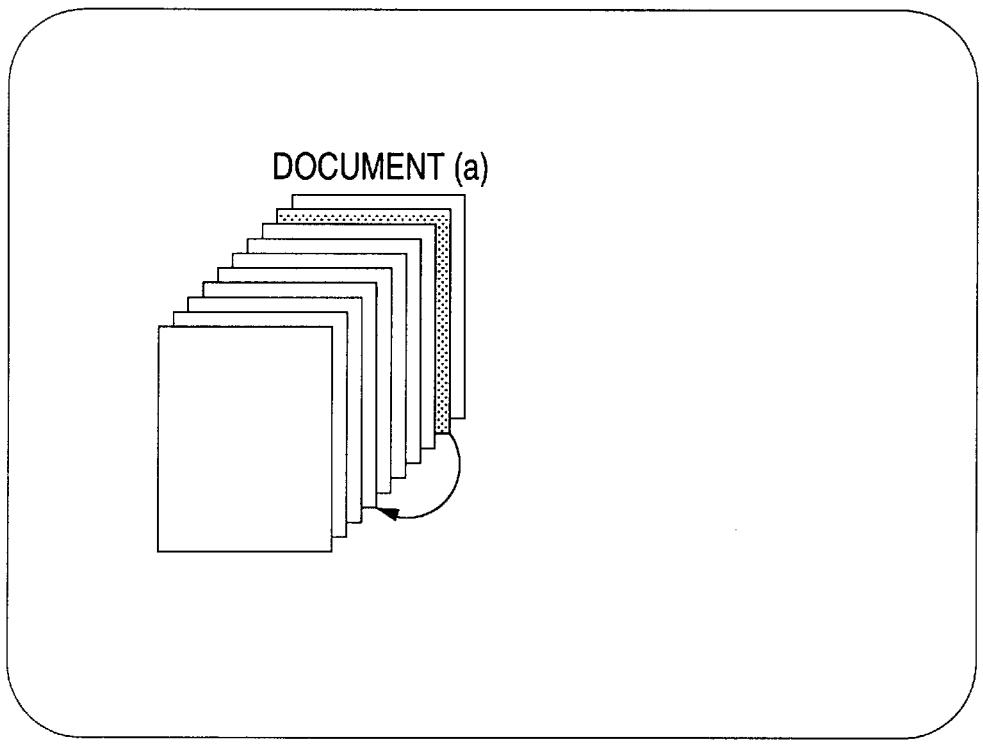
FIG. 5 is a schematic diagram explaining a page move and a page copy within a single document.

First, as shown in FIG. 5, to perform edit processing of moving or copying a page within one document (a), the user operates, for example, the mouse 1 to specify the page to be moved or copied and drags the page to the document position in which the page is to be inserted. In response to the operation, the edit processing means 3 changes the display control data section and the actual data section of the document data.

Figure 6:
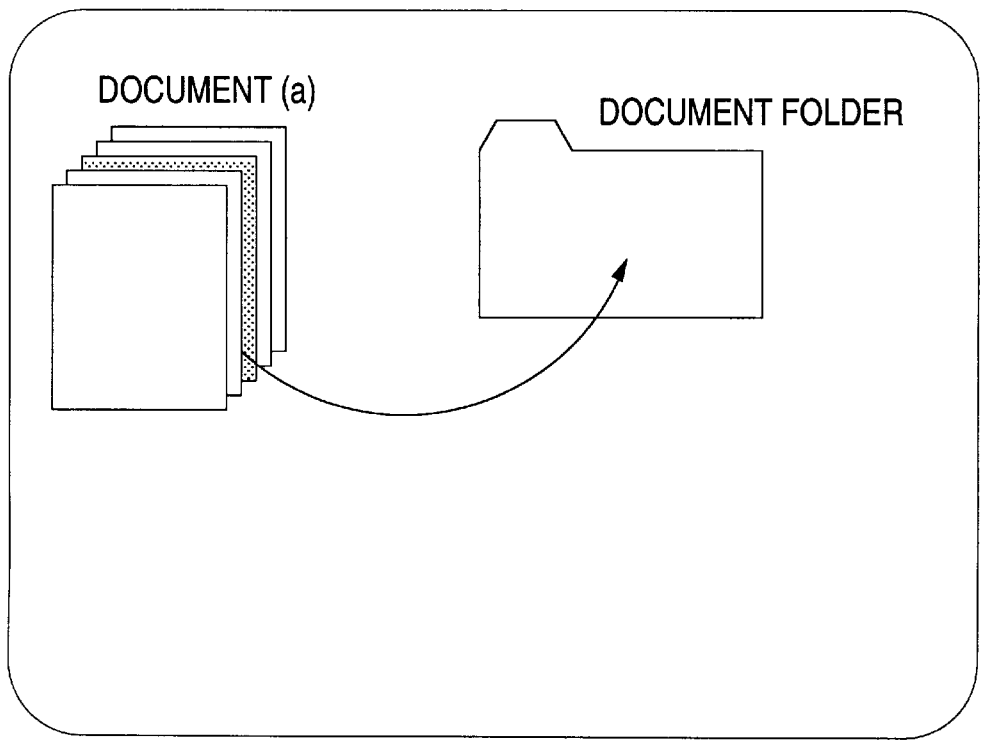
FIG. 6 is a schematic diagram explaining a page move to and a page copy into a document folder.

As shown in FIG. 6, to perform edit processing of moving or copying a page within one document (a) to or into the document folder, the user operates, for example, the mouse 1 to specify the page in the document (a) to be moved or copied and drags the page to the icon of the document folder. In response to the operation, the edit processing means 3 changes the display control data section and the actual data section of the document data.

Figure 7:
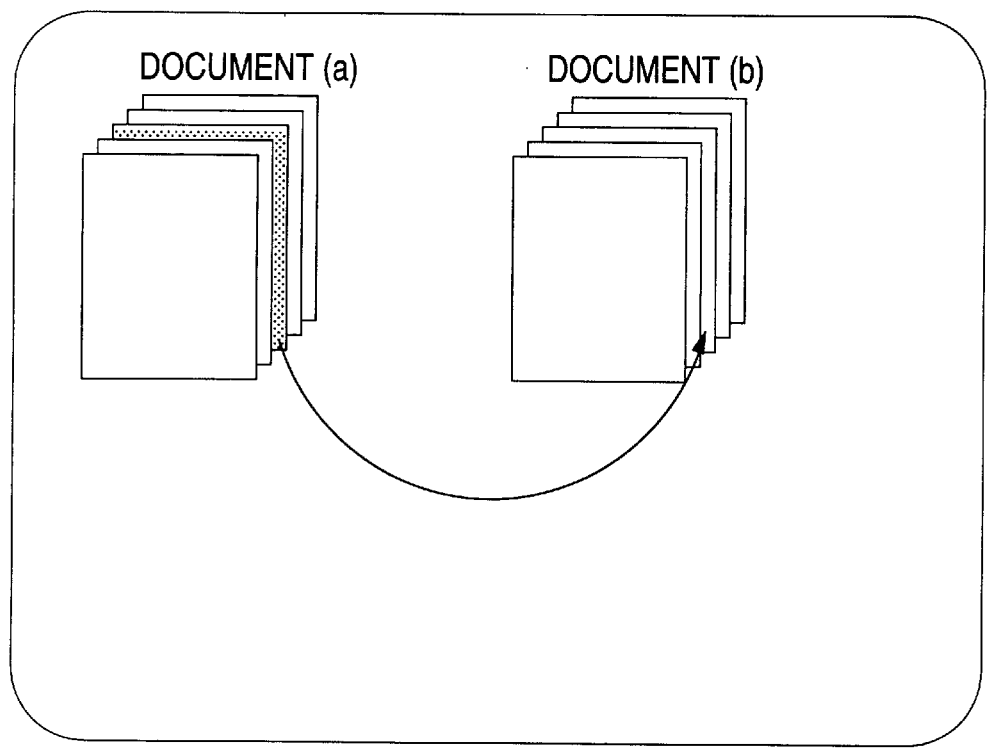
FIG. 7 is schematic diagram explaining a page move to and a page copy into another document.

As shown in FIG. 7, to perform edit processing of moving or copying a page within one document (a) to or into another document (b), the user operates, for example, the mouse 1 to specify the page in the document (a) to be moved or copied and drags the page to the position in the document (b) in which the page is to be inserted. In response to the operation, the edit processing means 3 changes the display control data section and the actual data section of the document data.

Figure 8:
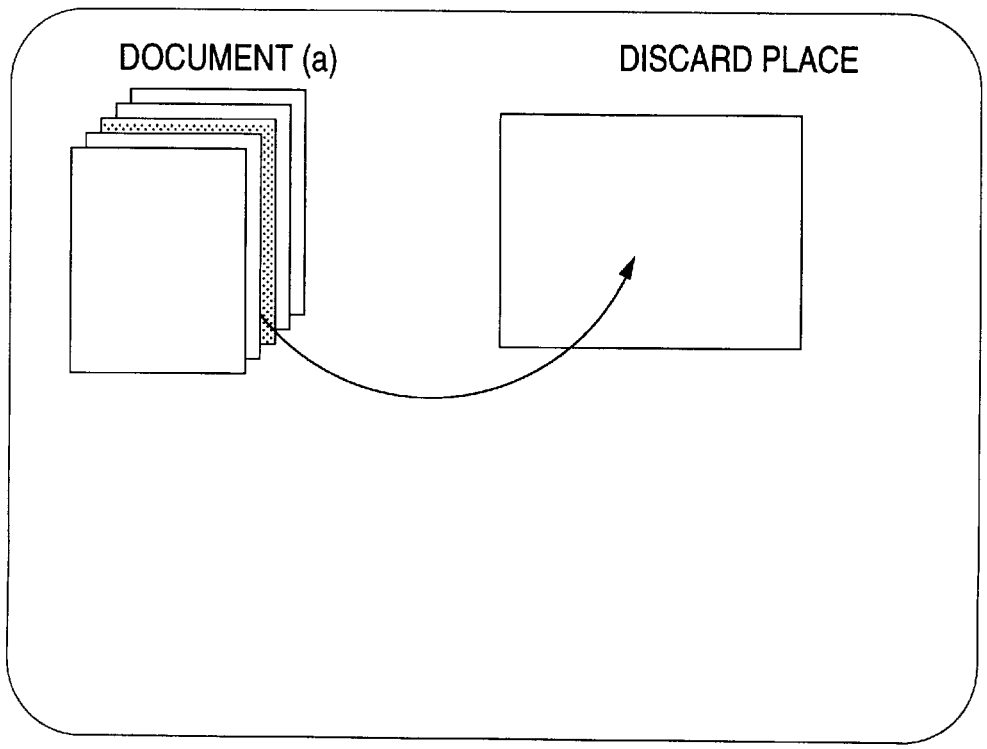
FIG. 8 is a schematic diagram explaining page discarding.

As shown in FIG. 8, to perform edit processing of discarding a page within one document (a), the user operates, for example, the mouse 1 to specify the page in the document (a) to be discarded and drags the page to the icon of the discard place. In response to the operation, the edit processing means 3 changes the display control data section and the actual data section of the document data.

Figure 9:
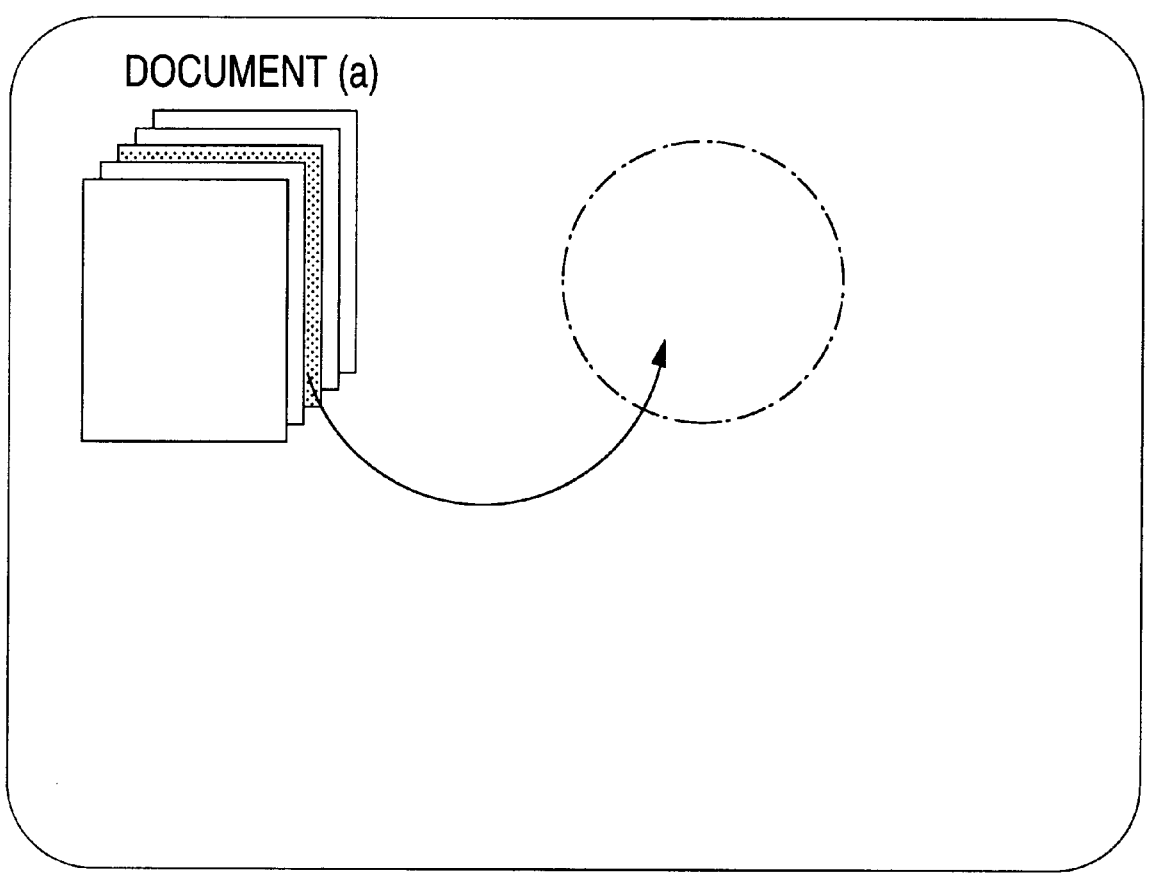
FIG. 9 is a schematic diagram explaining creation of a new document by a page move and a page copy.

As shown in FIG. 9, to perform edit processing of moving or copying a page within one document (a) for creating a new document, the user operates, for example, the mouse 1 to specify the page in the document (a) to be moved or copied and drags the page to an unassigned area (blank area) of the display screen or the icon of the document folder. In response to the operation, the edit processing means 3 creates new document data and changes the display control data section and the actual data section of the document data.

To discriminate the move and copy commands from each other, the user holds down a predetermined key, such as a function key, while he or she performs the mouse operation, for example.

In addition to the mouse operation, the commands may be entered through the keyboard for specifying the page with cursor keys and pressing predetermined keys.

The edit processing procedures in page units will be discussed with reference to flowcharts shown in FIGS. 10–14.

Figure 10:
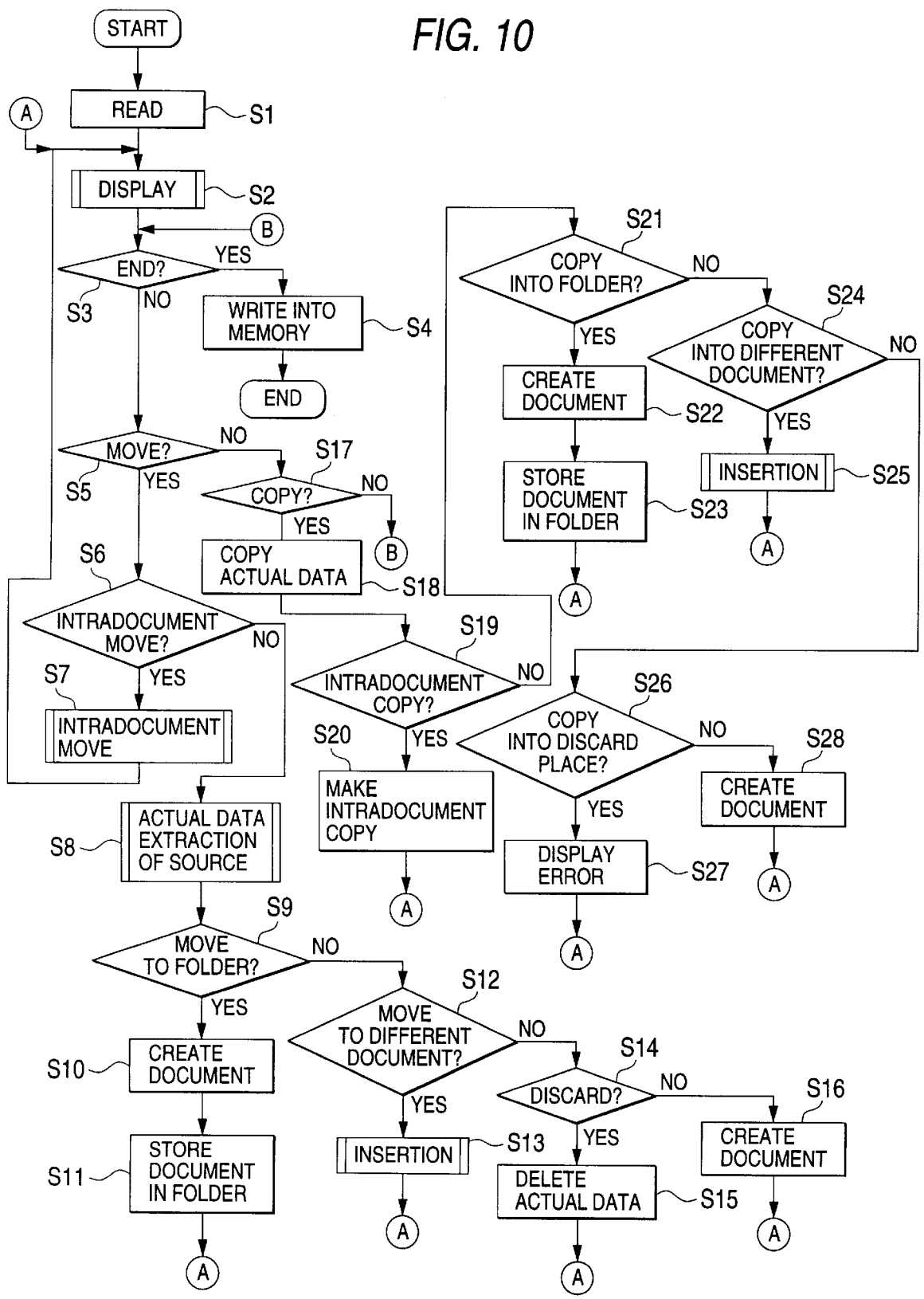
FIG. 10 is a functional flowchart showing an edit process software routine used in to the embodiment of the invention.

First, as shown in FIG. 10, when the document edit system is started and a document display command is entered through the input means 1, the edit processing means 3 reads the specified document data (display control data section and actual data section) from the external memory 5 into the internal memory 4 at step S1 and causes the display processing means 6 to display the image of the document at step S2 by drawing pages in the document; the document image is displayed on the screen of the display 7 in offset overlapped relation.

The edit processing means 3 checks whether or not any command is entered through the input means 1 and if an end command is entered at step S3, writes back the document data stored in the internal memory 4 into the external memory 5 and terminates the process at step S4. If another command is entered, the edit processing means 3 determines whether or not the command is a page move command at step S5 and if it is a move command, further determines whether or not the command is an intradocument move command at step S6.

If the command is determined to be an intradocument page move command, the edit processing means 3 executes an intradocument move process as described below for rewriting the display control data of the document stored in the internal memory 4 in response to the page move at step S7 and the display processing means 6 updates the document image display based on the new document data at step S2. Which document is specified is determined by the fact that mouse operation is applied to the region of a page in the document. Where the destination is in the document is determined by which page position in the document the mouse drag end point is in.

On the other hand, if the command is a move command, but not an intradocument move command, the edit processing means 3 executes an actual data extraction process of the source as described below for extracting the actual data of the specified page stored in the internal memory 4 in response to the page move at step S8.

The edit processing section 3 determines whether or not the move command is a move command to the document folder at step S9 and if it is a move command to the document folder, creates a new document in the internal memory 4 and stores the specified page therein at step S10 and further stores the new document in the document folder at step S11. The move process result is reflected in the document image displayed on the screen of the display 7 by the display process at step S2 described above. Whether or not the destination is the document folder is determined by the fact that the mouse drag end point is in the screen display region of the document folder icon.

The edit processing means 3 executes the step S10 of creating a new document and storing the specified page therein by creating the display control data section for the new document in the internal memory 4 and relates the actual data of the page extracted from the document in response to the command to the display control data section. The data of the new document is read out from the internal memory 4 and displayed on the screen at step S2 and written into the external memory 5 at step S4.

On the other hand, if the move command is not a move command to the document folder, the edit processing means 3 determines whether or not it is a move command to a different document at step S12 and if the command is a page move command to a different document, executes an insertion process described below at step S13 for newly relating the actual data of the page extracted from the document in response to the command to the display control data section of the different document. The move process result is displayed on the screen by the display process at step S2 and written into the external memory 5 for rewriting the contents thereof 5 at step S4. Whether or not the destination is the different document is determined by the fact that the mouse drag end point is in the area of the different document displayed on the screen.

On the other hand, if the move command is not a move command to a different document, the edit processing means 3 determines whether or not it is a move command to the discard place at step S14 and if the command is a page move command to the discard place, deletes the actual data of the page extracted from the document in response to the command at step S15. The discard process result is displayed on the screen by the display process at step S2 and written into the external memory 5 at step S4. Whether or not the destination is the discard place is determined by the fact that the mouse drag end point is in the discard place icon displayed on the screen.

On the other hand, if the move command is not a move command to the discard place, it is a move command to an unassigned area on the screen. Then, the edit processing means 3 creates a new document in the internal memory 4 as at step S10 described above and relates the actual data of the page extracted from the document in response to the command to the display control data section of the new document at step S16. The move process result is displayed on the screen of the display 7 by the display process at step S2 and written into the external memory 5 at step S4. Whether or not the destination is an unassigned area is determined by the fact that the mouse drag end point is not in the area of the documents, the document folder icon, or the discard place icon displayed on the screen.

If the edit command is determined not to be a move command at step S5 above, the edit processing means 3 determines whether or not the command is a copy command at step S17. If it is not a copy command either, the edit processing means 3 determines whether or not the command is an end command.

On the other hand, if it is a copy command, the edit processing means 3 copies the actual data of the specified page in the document at step S18. In this case, the specified page is only copied and the total number of pages in the document and the page order are not changed, thus the display control data and actual data of the document are not changed.

The edit processing means 3 determines whether or not the copy command is an intradocument copy command at step S19 and if it is an intradocument copy command, relates the actual data of the copy page to the display control data section of the document at step S20. Further, at this step, the edit processing means 3 rewrites the display control data of the document for incrementing the "total number of pages" by the number of copy pages and relates the actual data of the copy page to the specified position in the document.

In the step, the display control data and actual data of the document stored in the internal memory 4 are changed and the display processing means 6 updates the document image display based on the new document data at step S2. Where the copy destination is in the document is determined by which page position in the document the mouse drag end point is in.

On the other hand, if the command is a copy command, but not an intradoucment copy command, the edit processing section 3 determines whether or not the copy command is a copy command into the document folder at step S21 and if it is a copy command into the document folder, creates a new document in the internal memory 4 and stores the actual data of the copy page therein at step S22 and further stores the new document in the document folder at step S23, as at steps S10 and S11 described above. The copy process result is reflected in the document image displayed on the screen of the display 7 by the display process at step S2 described above. Whether or not the copy destination is the document folder is determined by the fact that the mouse drag end point is in the screen display region of the document folder icon.

On the other hand, if the copy command is not a copy command into the document folder, the edit processing means 3 determines whether or not it is a copy command into a different document at step S24 and if the command is a copy command into a different document, executes an insertion process described below at step S25 for newly relating the actual data of the copy page to the display control data section of the different documnet. The copy process result is displayed on the screen by the display process at step S2 and written into the external memory 5 at step S4. Whether or not the copy destination is the different document is determined by the fact that the mouse drag end point is in the area of the different document displayed on the screen.

On the other hand, if the copy command is not a copy command into a different document, the edit processing means 3 determines whether or not it is a copy command into the discard place at step S26 and if the command is a copy command into the discard place, the copy command into the discard place cannot be actual, in which case an error message is displayed on the screen of the display 7 at step S27. Whether or not the copy destination is the discard place is determined by the fact that the mouse drag end point is in the discard place icon displayed on the screen.

On the other hand, if the copy command is not a copy command into the discard place, it is a copy command into an unassigned area on the screen. Then, the edit processing means 3 creates a new document in the internal memory 4 as at step S10 described above and relates the actual data of the copy page to the display control data section of the new document at step S28. The copy process result is displayed on the screen of the display 7 by the display process at step S2 and written into the external memory 5 at step S4. Whether or not the copy destination is an unassigned area is determined by the fact that the mouse drag end point is not in the area of the documents, the document folder icon, or the discard place icon displayed on the screen.

Figure 11:
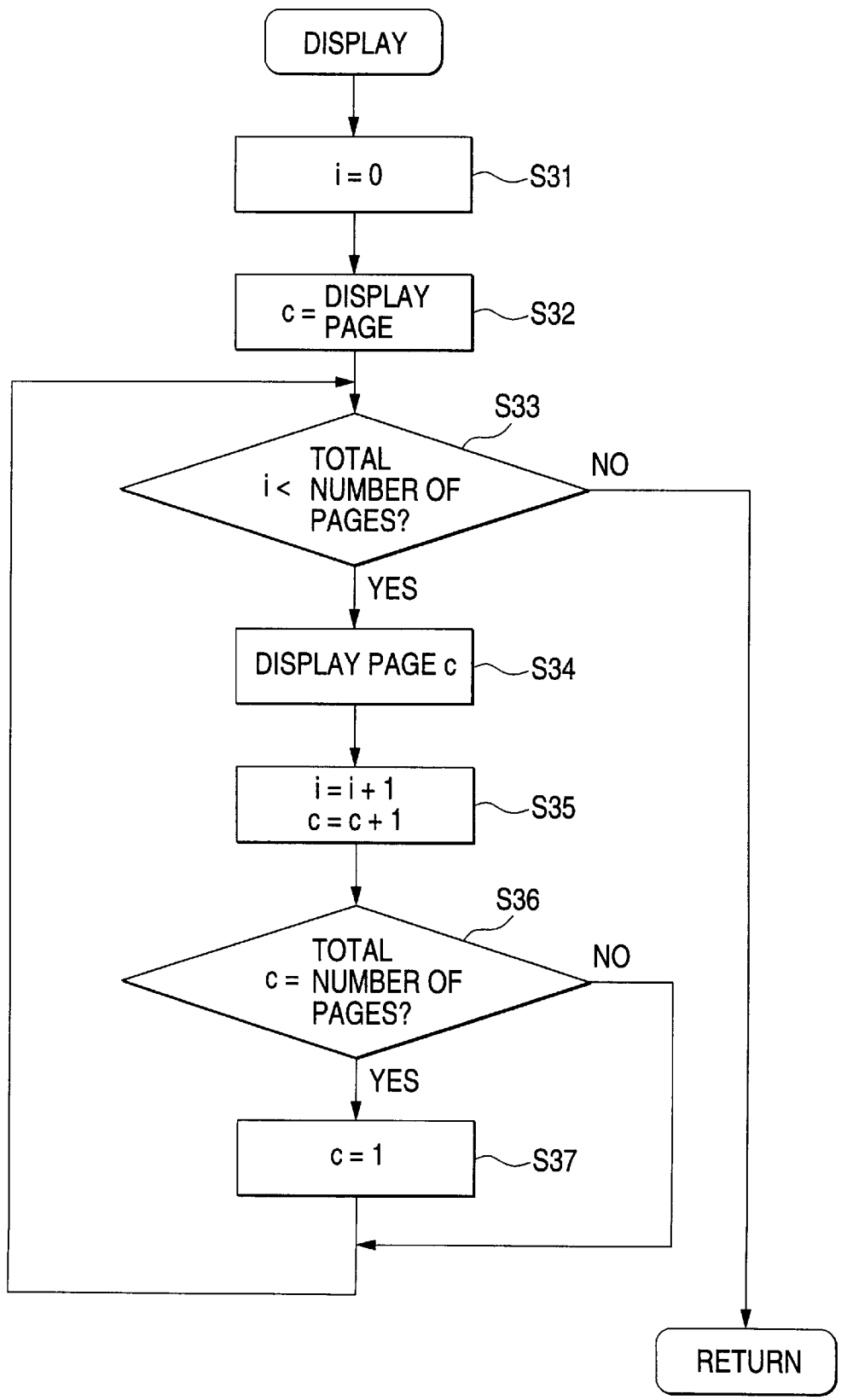
FIG. 11 is a functional flowchart showing a display process software routine used in to the embodiment of the invention.

The above-described display process at step S2 is executed according to the procedure as shown in FIG. 11.

The display processing means 6 draws an document image with pages displayed in offset overlapped relation based on the display control data. Since the first page in the document is not always the top page (display page) because of page turning, etc., a variable indicating the current page being displayed is c and a variable indicating the current page being processed is i.

First, the variable i is set to 0 indicating the first page at step S31 and the variable c is set to the page number set in the "display page" of the display control data at step S32 for setting the variable c so as to indicate the top page in the document.

The variable i is compared with the "total number of pages" of the display control data for determining whether or not the variable i is equal to or greater than the "total number of pages" at step S33. If it is equal to or greater than the "total number of pages," display for all pages in the document ends, the display process is terminated.

On the other hand, if display for all pages in the document has not yet end, the page frame indicated by the variable c is drawn at step S34.

In the page frame drawing step, initially the variable c indicates the top page in the document, thus the top page frame is drawn with the position indicated by the "display position" information of the display control data as the origin. The description contents of the top page are also drawn based on the corresponding actual data.

To display the next page, the variables i and c are incremented by one at step S35 and whether or not the variable c indicates the "total number of pages," namely, the end page in the document is determined at step S36. As a result, if the variable c indicates the end page, the next page is the first page, thus the variable c is set to 1 at step S37 and the steps S33 and later are repeated.

Since the variable c indicates a page other than the top page in the document at the step S34 of drawing the page frame in the loop, the position resulting from adding the offset amount indicated by the "position difference" information of the display control data to the origin of the top page is used as the origin for drawing the page frame. For example, if it is assumed that the origin of the top page is (X, Y) and $\Delta X$ and $\Delta Y$ are set in the "position difference" information as the horizontal and vertical offset amounts, the drawing origin of the page next to the top page becomes (X+$\Delta X$, Y+$\Delta Y$) and further the drawing origin of the next page becomes (X+2$\Delta X$, Y+2$\Delta Y$). Likewise, the page frames of all pages contained in the document are displayed in offset overlapped relation by $\Delta X$ and $\Delta Y$.

Figure 12:
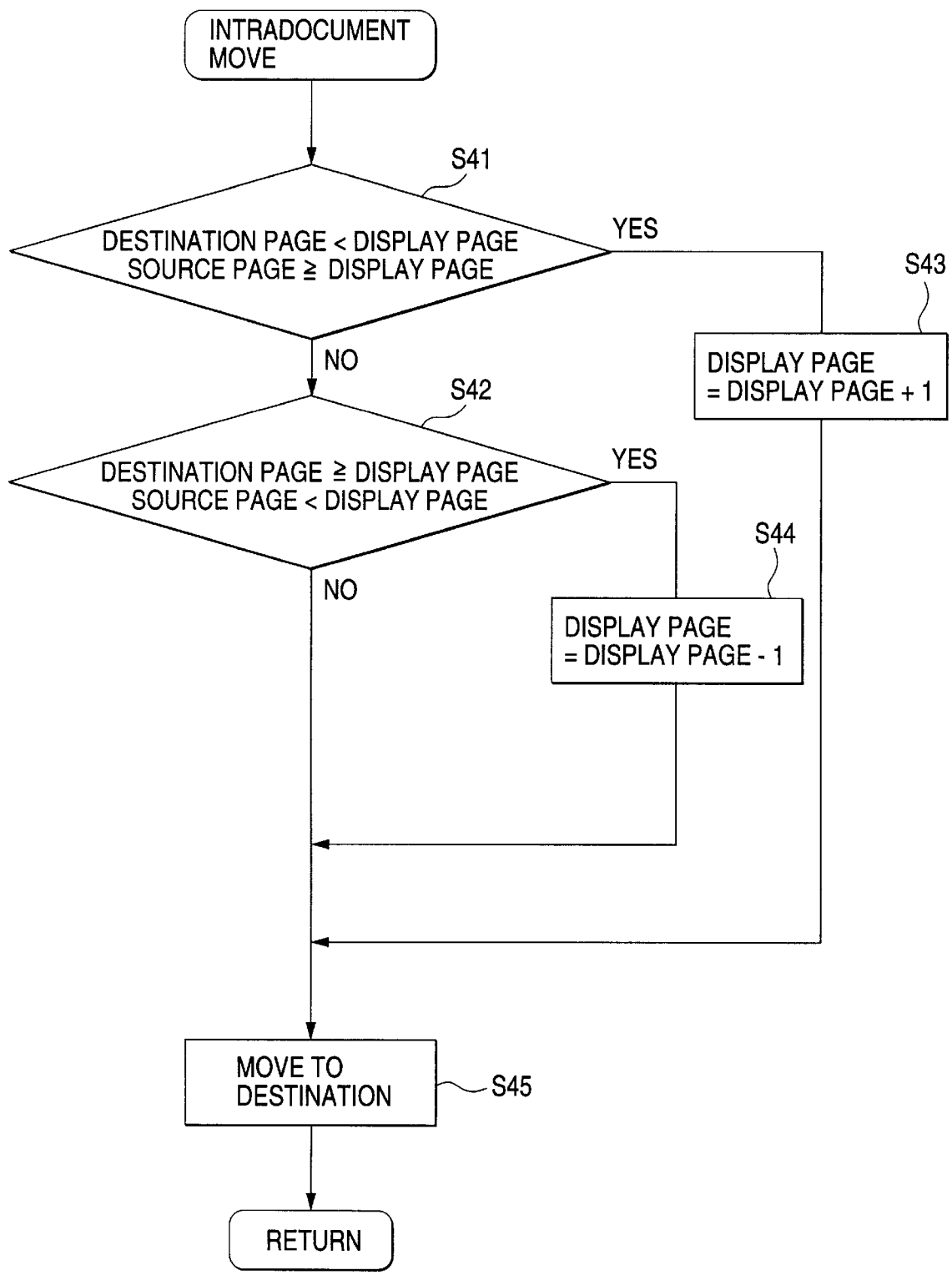
FIG. 12 is a functional flowchart showing an intradocument move software routine used in according to the embodiment of the invention.

The above-described intradocument move process at step S7 is executed according to the procedure as shown in FIG. 12.

First, whether or not the destination page precedes the current top page being displayed and the source page follows the current top page (including the current top page) at the same time, is determined based on the operation position with the mouse 1 at step S41. If this condition is completed, the "display page" of the display control data is incremented by one for backward sliding the page number of the displayed top page at step S43. On the other hand, whether or not the destination page follows the current top page being displayed (including the current top page) and the source page precedes the current top page, is also determined based on the operation position with the mouse 1 at step S42. If this condition is completed, the "display page" of the display control data is decremented by one for forward sliding the page number of the displayed top page at step S44.

After the display control data is thus changed, the new position of the moved page is reflected in the relation between the actual data and the display control data of the moved page at step S45 and the process is terminated. That is, in the intradocument move process, the number of pages in the target document remains the same and the position of the specified page is changed.

Figure 13:
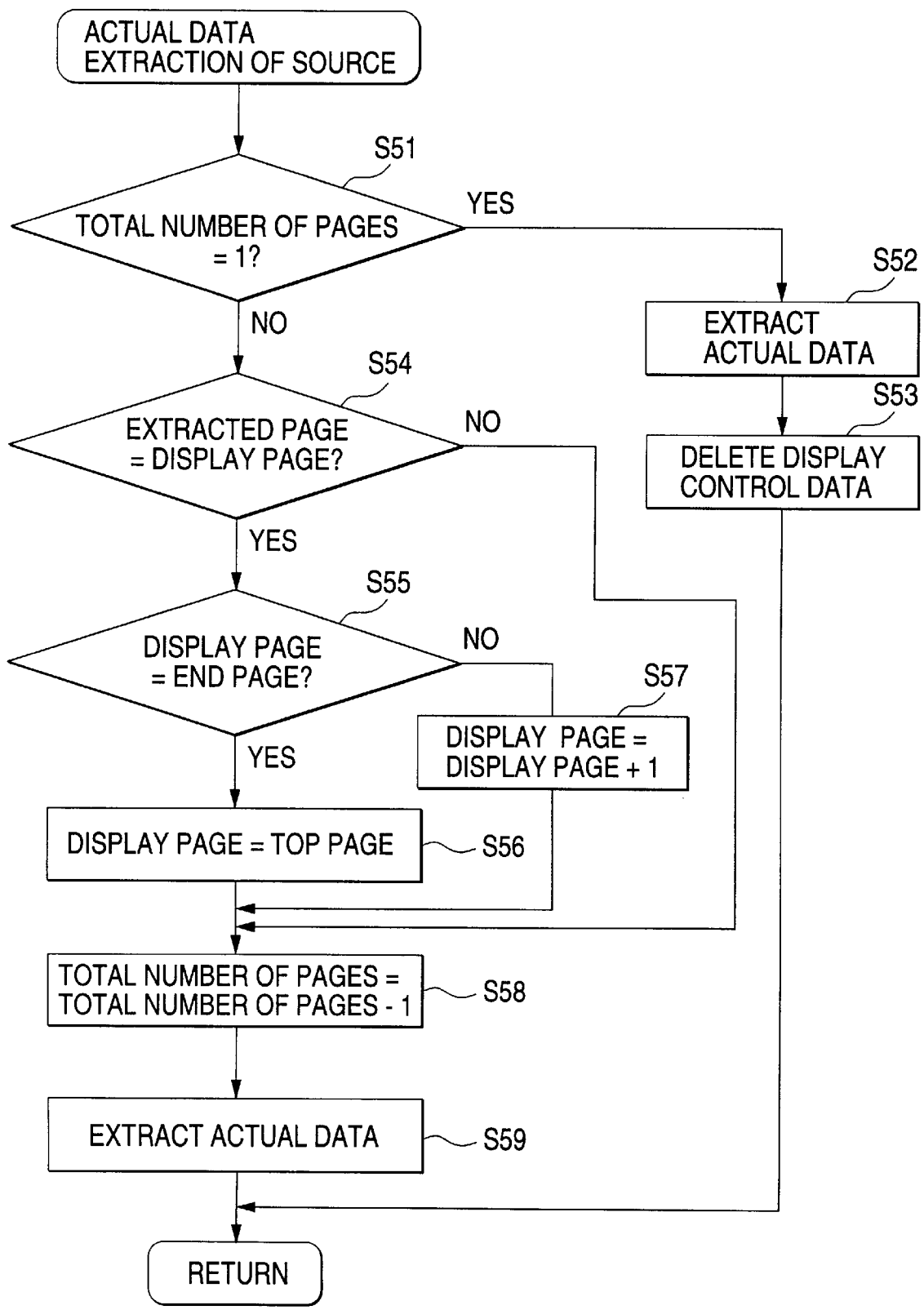
FIG. 13 is a functional flowchart showing an actual data extraction software routine of a source used in the embodiment of the invention.

The above-described actual data extraction process of the source at step S8 is executed according to the procedure as shown in FIG. 13.

First, whether or not the number of pages contained in the document is one is determined by the "total number of pages" information of the display control data at step S51. If it is one, the actual data is extracted from the actual data section at step S52. For the document containing no actual data, the display control data of the document is also deleted from the internal memory 4 and the process is terminated at step S53.

On the other hand, if the document contains a plurality of pages, whether or not the page extracted in response to the edit command is the current display page (top page) is determined based on the "display page" information of the display control data at step S54. If it is not the top page, the "total number of pages" information of the display control data is decremented by the number of extracted pages (in this case, one) at step S58, the relation with the display control data is cleared, the actual data of the specified page is extracted from the actual data section, and the process is terminated at step S59.

In contrast, if the page extracted in response to the edit command is the top page, whether or not the extracted page is the end page in the document is determined based on the "display page" information of the display control data at step S55. If it is the end page, the first page next to the end page is displayed. Then, the "display page" information of the display control data is changed to the top page at step S56 and steps S58 and later are executed. On the other hand, if the extracted page is not the end page, the pages next to the displayed page will be displayed in order. Then, the "display page" information of the display control data is incremented by one at step S57 so as to display the next page and steps S58 and later are executed.

Figure 14:
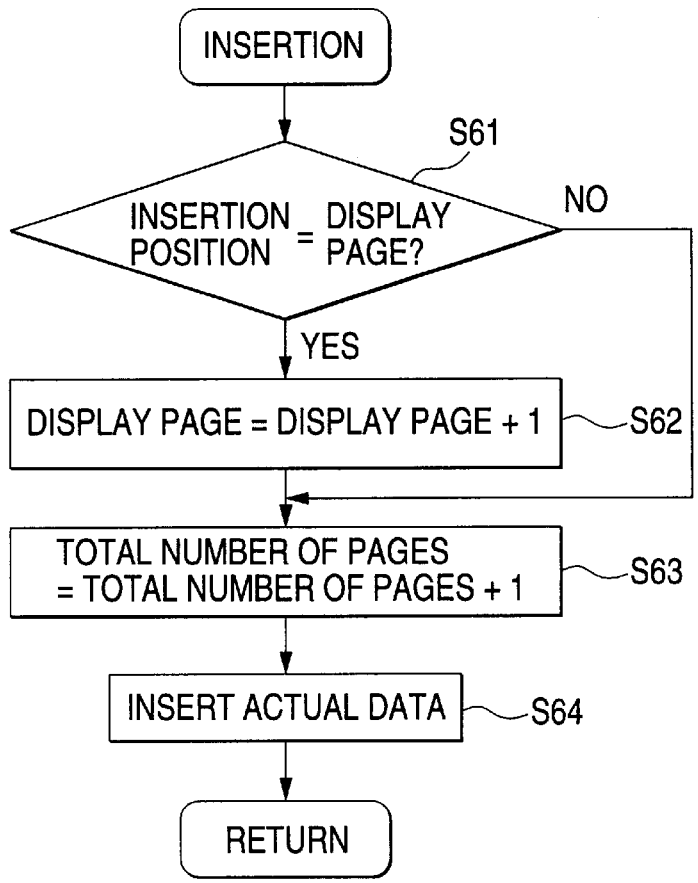
FIG. 14 is a functional flowchart showing an insertion process software routine used in the embodiment of the invention.

The above-described insertion process at step S13, S25 is executed according to the procedure as shown in FIG. 14.

First, whether or not the page insertion position precedes the display page in the different document is determined based on the "display page" information of the display control data of the different document at step S61. If it precedes the display page, the "display page" of the display control data of the different document is incremented by one for backward sliding the page number of the displayed top page at step S62; if it follows the display page, the page number of the displayed top page does not change, thus the "display page" is not changed.

The "total number of pages" information of the display control data of the different document is incremented by the number of inserted pages (in this case, one) at step S63 and the actual data of the inserted page is related to the display control data of the different document and the insertion process is terminated at step S64.

The processes are executed in the internal memory 4, whereby the display control data and the actual data stored in the internal memory 4 are changed and the screen display of the display 6 is also changed.

The invention is not limited to the embodiment and various modifications can be added.

For example, the attributes such as the size and orientation for each page may be contained in the display control data in batch rather than in the actual data of each page.

Figure 15:
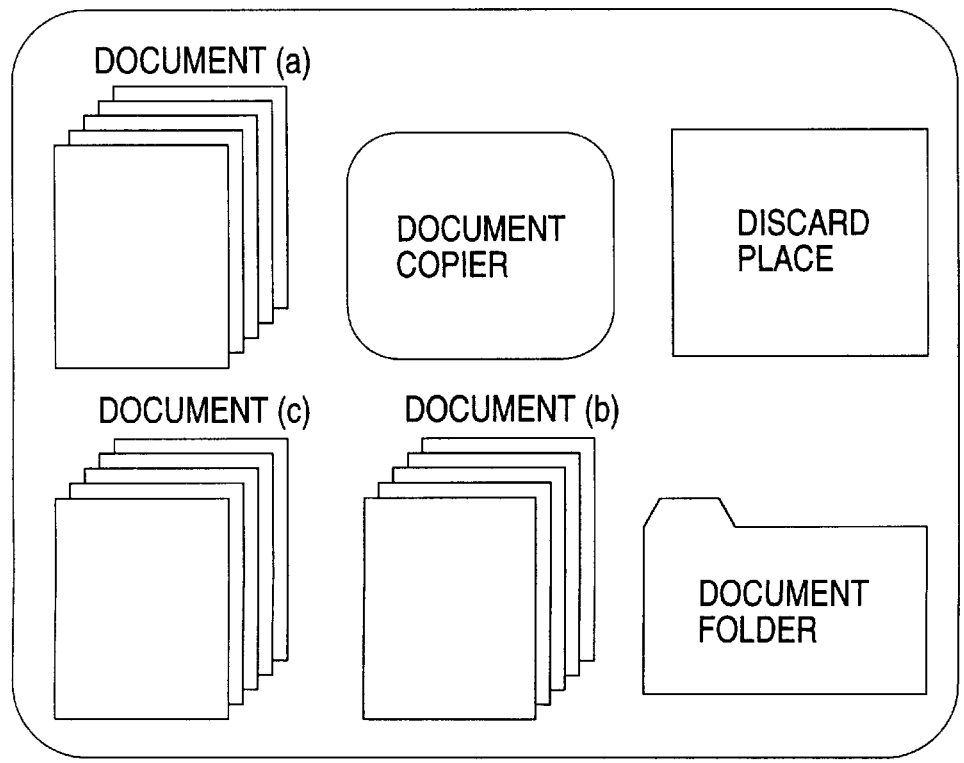
FIG. 15 is an illustration showing another example of a screen display generated by the system.

If a copier icon is displayed as a region for copying and any desired page is moved to the copier icon by drag operation of the mouse, the page may be copied into a different document, etc., as shown in FIG. 15. If such a copier icon is provided, copying can be executed in a sense as if a paper medium document were copied; electronic documents can be handled more like paper medium documents. Further, if data of each page is provided with copy inhibition information corresponding to the copier icon, a document can be prevented from being carelessly copied and security of data can also be provided.

As discussed in detail, according to the document edit system of a first aspect of the invention, the edit processing means performs predetermined edit processing for the data stored in the storage means for a document of pages displayed in offset overlapped relation, and the document image displayed on the screen is updated based on the resultant document data. Thus, a document consisting of a plurality of pages displayed on the screen can be edited in page units like a printed paper document.

The document edit system of a second aspect of the invention can make a page move of a document consisting of a plurality of pages within the document like a printed paper document by a simple process of rewriting display control data.

The document edit system of a third aspect of the invention can make a page move of a document consisting of a plurality of pages to a different document like a printed paper document by a simple process of rewriting display control data and moving the actual data.

The document edit system of a fourth aspect of the invention can make a page move of a document consisting of a plurality of pages for creating a new document like a printed paper document by a simple process of creating new display control data, rewriting display control data, and moving the actual data.

The document edit system of a fifth aspect of the invention can execute page discard of a document consisting of a plurality of pages like a printed paper document by a simple process of rewriting display control data and deleting the actual data.

The document edit system of a sixth aspect of the imvention can make a page copy of a document consisting of a plurality of pages within the document like a printed paper document by a simple process of rewriting display control data and copying the actual data.

The document edit system of a seventh aspect of the imvention can make a page copy of a document consisting of a plurality of pages into a different document like a printed paper document by a simple process of rewriting display control data, copying the actual data, and moving it.

The document edit system of a eighth aspect of the invention can make a page copy of a document consisting of a plurality of pages for creating a new document like a printed paper document by a simple process of creating new display control data, rewriting display control data, copying the actual data, and moving it.

What is claimed is:

1. A document edit system for editing a document having pages displayed on a display screen in offset overlapped relation in page units, said system comprising:

storage means for storing display control data including page overlap order data, page display position data, and page number per document data, said storage means further storing actual data defining the contents of each page, said display control data and said actual data being related to each other for each document;

input means for entering an edit command indicating a document edit function while specifying a page to be edited in said document displayed in offset overlapped relation in page units;

edit processing means for performing predetermined edit operations on the data stored in said storage means in response to the entered edit command;

display processing means for displaying an image of the document with the pages thereof displayed in offset overlapped relation on the display screen based on the page overlap order data stored in said storage means; and displayed page change means for changing the page overlap order data stored in said storage means in response to an instruction for changing a page to be displayed on the top of the document so that the current top page is displayed behind the current end page in said offset overlapped image of said document.

2. The document edit system as claimed in claim 1, wherein a special edit command for moving a specified page within a first document to a specified other page within said first document is entered through said input means, and in response to said command said edit processing means revises the page overlap order and page display position data stored in said storage means for said first document.

3. The document edit system as claimed in claim 1, wherein a special edit command for moving a specified page in a first document to a specified page in a second document is entered through said input means, and in response to said command said edit processing means revises the page overlap order data and page display position data stored in said storage means for said first document, decrements the page number per document data for said first document, clears the relation between the actual data of the specified page and the first document, and relates said actual data to the second document.

4. The document edit system as claimed in claim 3, wherein said edit processing means deletes the image of said first document when the page number of said page number per document data for said first document becomes zero.

5. The document edit system as claimed in claim 1, wherein a special edit command for moving a specified page in a first document to an unassigned area on the display screen is entered through said input means, and in response to said command said edit processing means revises the page overlap order data and page display position data stored in said storage means for said first document, decrements the page number per document data for said first document, creates a new document in said storage means with display position data indicating said specified page, clears the relation between the actual data of the specified page and the first document, and relates said actual data to said new document.

6. The document edit system as claimed in claim 1, wherein a special edit command for moving a specified page in a first document to a discard icon preset on the screen is entered through said input means, and in response to said command said edit processing means revises the page overlap order data and page display position data stored in said storage means for said first document, decrements the page number per document data for said first document, clears the relation between the actual data of said specified page and the first document, and deletes the actual data for said specified page.

7. The document edit system as claimed in claim 1, wherein a special edit command for copying a specified page within a first document to a specified other page within said first document is entered through said input means, and in response to said edit command said edit processing means revises the page overlap order data and page display position data stored in said storage means for said first document, increments the page number per document data for said first document, and copies the actual data of the specified page and relates it to said first document.

8. The document edit system as claimed in claim 1, wherein a special edit command for copying a specified page in a first document into a specified page in a second document is entered through said input means, and in response to said command said edit processing means revises the page overlap order data and page display position data stored in said storage means for said first document, copies the actual data of said specified page, and relates said copied data to said second document.

9. The document edit system as claimed in claim 1, wherein a special edit command for copying a specified page in a first document into an unassigned area on the display screen is entered through said input means, and in response to said command said edit processing means revises the page overlap order data and page display position data stored in said storage means for said first document, creates a new document in said storage means with display position data indicating said specified page, copies the actual data of the specified page, and relates said copied data to said new document.

* * * * *